H. D. MEYERS.
SHOCK ABSORBER.
APPLICATION FILED NOV. 16, 1917.
1,271,346.
Patented July 2, 1918.
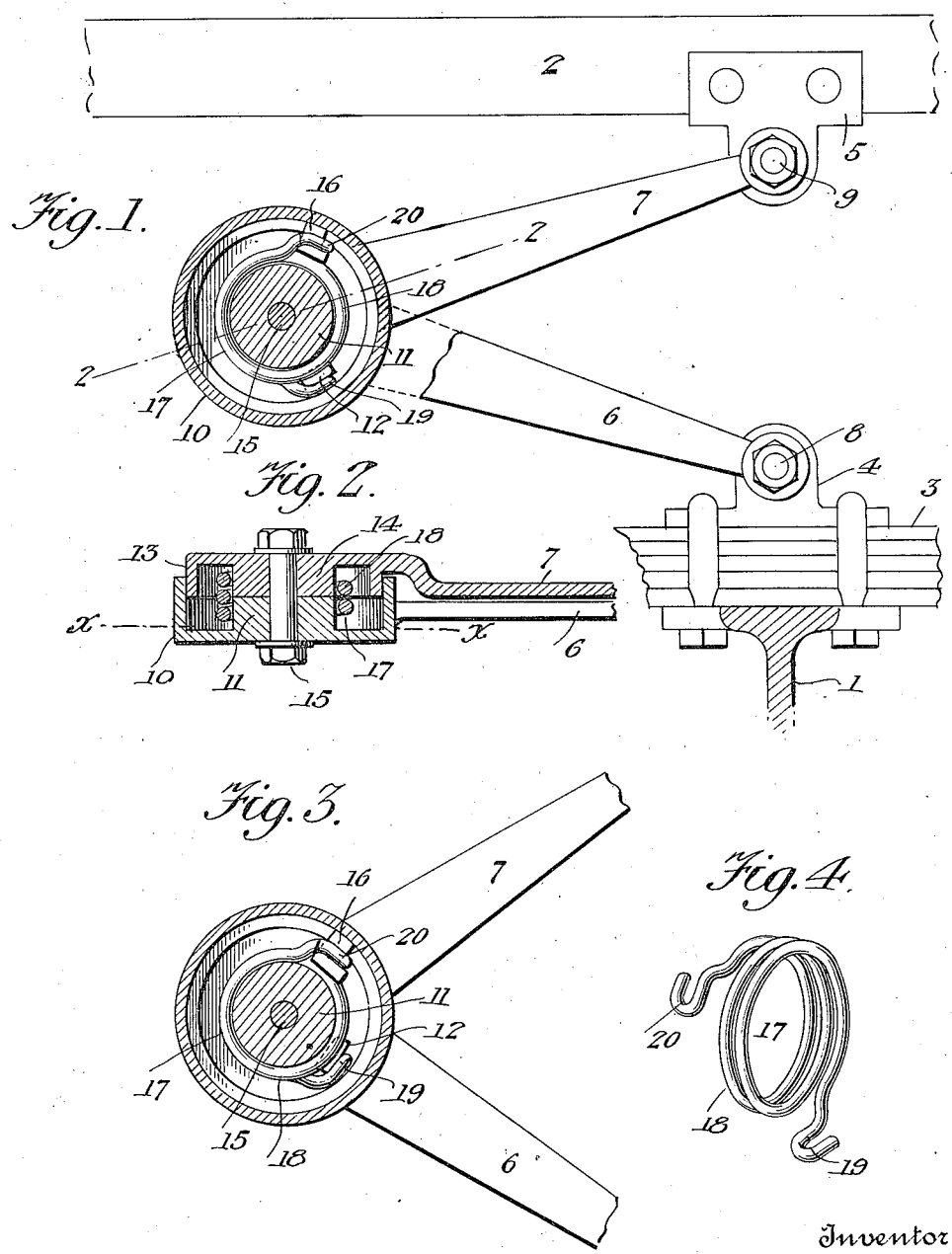
Inventor
Hugh D. Meyers
Witness
J. W. Garner
By Victor J. Evans
Attorney

UNITED STATES PATENT OFFICE.

HUGH D. MEYERS, OF GRUNDY CENTER, IOWA.

SHOCK-ABSORBER.

1,271,346.                    Specification of Letters Patent.        Patented July 2, 1918.

Application filed November 16, 1917. Serial No. 202,369.

*To all whom it may concern:*

Be it known that I, HUGH D. MEYERS, a citizen of the United States, residing at Grundy Center, in the county of Grundy and State of Iowa, have invented new and useful Improvements in Shock-Absorbers, of which the following is a specification.

This invention relates to improvements in shock absorbers especially adapted for use on motor vehicles and has for its object to provide an absorber which is simple in construction, comparatively inexpensive to manufacture and which is thoroughly efficient in action.

The invention consists in the construction, combination and arrangement of devices hereinafter described and claimed.

In the accompanying drawings:—

Figure 1 is an elevation, partly in section, of a shock absorber constructed in accordance with my invention and showing the same arranged in operative relation to the chassis and one of the springs of an automobile.

Fig. 2 is a sectional view of the same on the plane indicated by the line 2—2 of Fig. 1.

Fig. 3 is a sectional view, similar to Fig. 1, and showing the action of the absorber during a rebound.

Fig. 4 is a detailed perspective view of the coiled spring.

The rear axle of an automobile is indicated in Fig. 1 at 1, a part of the chassis at 2, a part of one of the rear springs at 3 and the usual brackets are indicated at 4, 5, respectively bolted to the axle and chassis.

My improved shock absorber comprises a pair of arms 6, 7 which are respectively pivotally connected at 8, 9 to the brackets 4, 5. The arm 6 has a cylindrical head 10 provided with a centrally arranged drum 11 and also has a radially arranged lug 16. The arm 7 has a similar but somewhat smaller head 13 which is fitted in the head 10 and a drum 14 which bears against the drum 11, the heads 10, 13 being pivotally connected together by a bolt 15 which is arranged in central openings with which the heads are provided. The head 13 has a hook-shaped lug 12 arranged therein.

A spring 17 is arranged in the heads and has coils 18 which extend around the drums. The ends of the coil spring are formed with hooks 19, 20 which are respectively connected to the lugs 12, 16.

During the downward movement of the chassis with respect to the rear axle the lugs 12, 16 of the respective heads move from each other and the tension of the coils around the drums is relaxed. During a rebound, however, as the chassis moves upwardly the lugs 12, 16 move toward each other, as will be noted by reference to Fig. 3 of the drawing, and the coils are caused to bind closely around the drums and to thereby check the rebound and absorb the shock.

The parts of my improved shock absorber are simple in construction, can be readily manufactured at small cost and can be readily assembled and disassembled.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. In a shock absorber, a pair of lever arms pivotally connected together and provided with a drum concentric with the pivot, and a spring having an intermediate portion coiled around the drum and having its ends connected to the lever arms.

2. In a shock absorber, a pair of lever arms pivotally connected together and provided on their opposing sides with contacting drum elements concentric with the pivot, and a spring having an intermediate portion coiled around the drum formed by the drum elements and having its ends connected to the lever arms.

3. In a shock absorber, a pair of lever arms pivotally connected together and provided on their opposing sides with contacting drum elements concentric with the pivot, and a spring coiled around the drum formed by the drum elements and having its ends connected to the lever arms, said lever arms also having cylindrical heads concentric with the drum elements.

In testimony whereof I affix my signature.

HUGH D. MEYERS.